Figure 1:
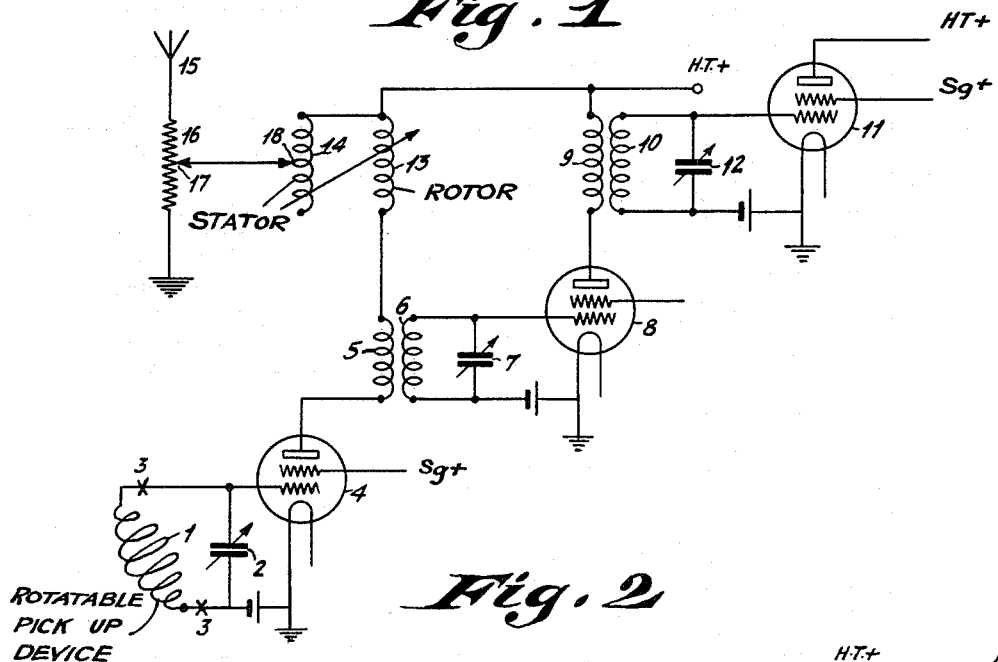

April 17, 1934.　　　　F. WOODS　　　　1,955,267

DIRECTIONAL RECEIVER

Filed Aug. 27, 1932　　　2 Sheets-Sheet 1

INVENTOR
FRED WOODS
BY H.G. Grover
ATTORNEY

April 17, 1934.　　　F. WOODS　　　1,955,267
DIRECTIONAL RECEIVER
Filed Aug. 27, 1932　　2 Sheets-Sheet 2
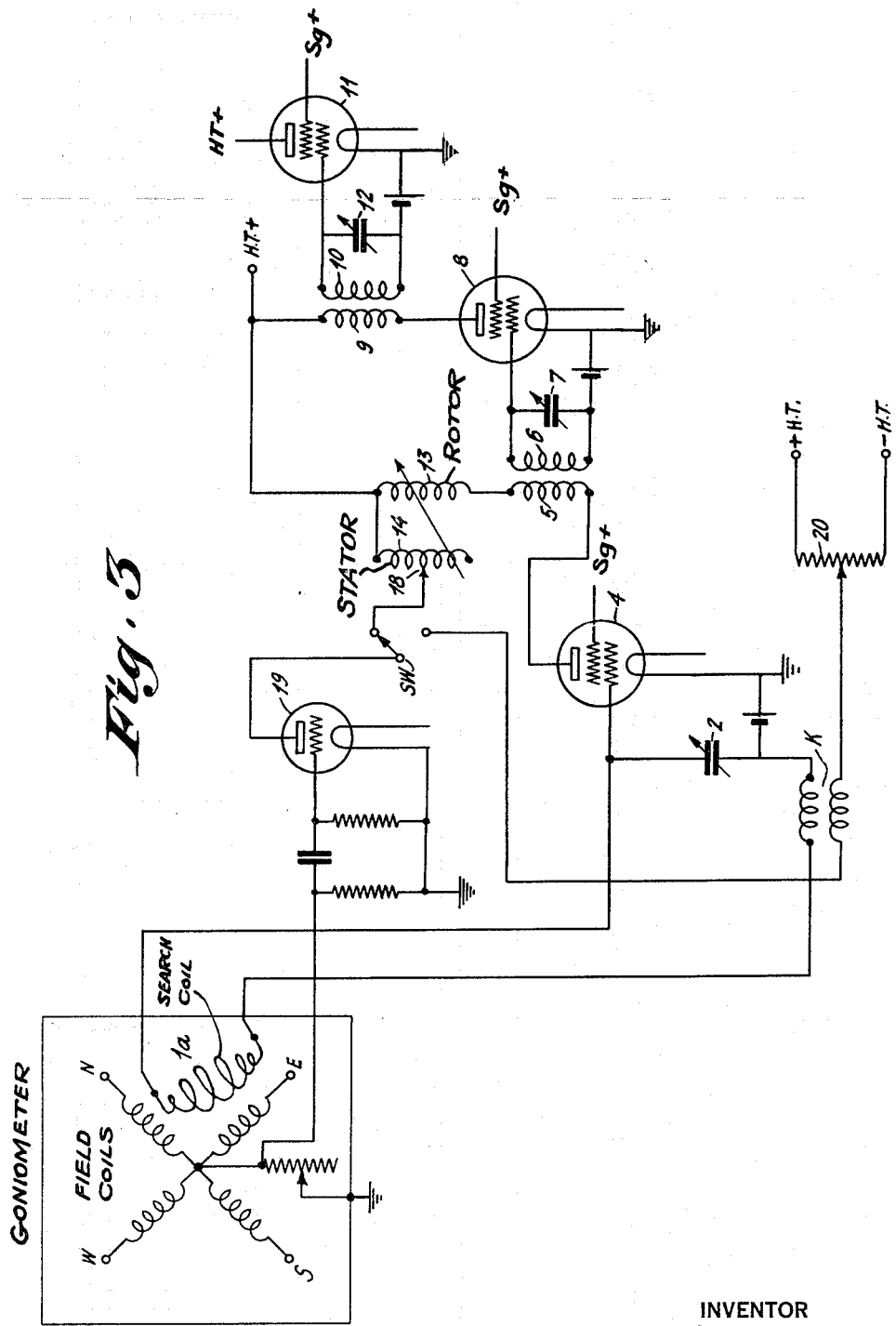
INVENTOR
FRED WOODS
BY H.S. Grover
ATTORNEY Patented Apr. 17, 1934

1,955,267

UNITED STATES PATENT OFFICE 1,955,267

DIRECTIONAL RECEIVER

Fred Woods, Richmond, England, assignor to Radio Corporation of America, a corporation of Delaware Application August 27, 1932, Serial No. 630,647
In Great Britain September 4, 1931

5 Claims. (Cl. 250—11)

This invention relates to radio direction finders and directional radio receivers.

It is well known that the theoretically desirable "absolute zero" position is hardly ever obtained in practice with radio direction finders, it being found that instead of giving a sharply defined zero direction the great majority of directional receivers give a minimum received signal strength over an arc.

The object of the present invention is to provide a directional receiving system whereby a more sharply defined "zero direction", i. e., a direction wherein zero signal strength or a strength of signal approximating closely to zero, may be obtained.

Although there are a number of contributing factors which together cause indefiniteness of the "zero signal" position in a directional radio receiver, it is believed that the most important contributing factor is that due to direct or inherent signal pick-up by the circuit components of the receiver as a whole. An experimentally observed fact confirming this belief is that if an ordinary direction finding installation be sharply tuned to the carrier wave of, for example, a nearby broadcast transmitter of fairly large power, the signal from this transmitter may still be detected even if the frame aerial or equivalent input circuit be removed.

According to this invention a directional receiver or direction finder comprises means for applying at a suitable point or points in the receiver circuit a balance component of received signals of such magnitude and phase as substantially to compensate for signals obtained by what is herein termed "inherent pick up", e. g., signals which would be obtained were the frame aerial or equivalent input circuit removed.

The invention is applicable broadly to all types of directional receiving installations, e. g., to so-called Bellini-Tosi systems wherein fixed frame aerials and a radiogoniometer are employed, as well as to rotatable frame aerial systems. From the point of view of the present invention the search coil of the radiogoniometer in a Bellini-Tosi system may be regarded as equivalent to the loop or frame aerial in a rotating frame system.

Where the directional receiving installation includes an open aerial for "sense finding", the usual case, the balancing component of signal is preferably obtained from the same open aerial as is employed for "sense finding".

Preferably also the balancing component of signal is applied in the plate circuit of the first high frequency valve in the receiver amplifier as this presents the advantage that where a gang controlled tuning is employed the ganged control need not be disturbed for purposes of employment of the present invention. It is, of course, possible to apply the balancing component of signal at any convenient point in the receiving circuit as circumstances may dictate.

Figure 2:
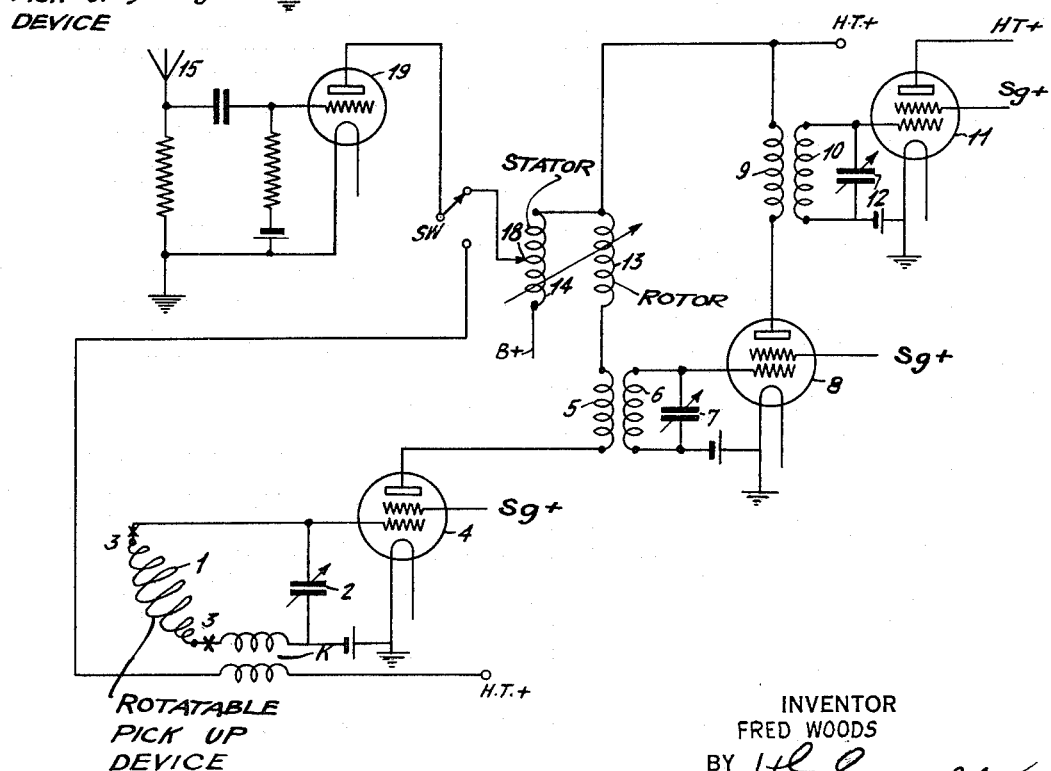

The invention is illustrated in the invention, in which:

Figure 1 shows a directional receiver circuit including a novel means for compensating for the effect of radiant energy or disturbing energy on the circuits of the receiver other than the pick-up circuits; while, Figures 2 and 3 show modifications of the arrangement of Figure 1.

Referring to Figure 1 of the drawings, 1 is a rotatable frame aerial, or the search coil of a radiogoniometer, which is tuned by a condenser 2 connected in shunt therewith either directly or through switch contacts indicated by crosses 3. The tuned input circuit thus constituted is applied between grid and cathode of a screen grid amplifier valve 4 whose anode circuit includes a coil 5 coupled to a coil 6, the latter coil being tuned by a condenser 7 so as to constitute the tuned input circuit of the second high frequency valve, also a screen grid valve, 8. The valve 8 is similarly coupled in cascade through coils 9 and 10 to a third valve 11, the coil 10 being tuned by a condenser 12. Further high frequency stages may be provided, if required, and preferably the tuning condensers 7 and 12 and any subsequent tuning condensers which may be provided are gang controlled. The anode circuit of the valve 4 also contains a rotatably mounted coil 13 which is arranged to rotate through at least 180° and which is variably coupled to a coil 14, the arrangement being such that both the sense and magnitude of the coupling may be varied by rotating the coil 13.

The coil 14 receives balancing signal components from an open aerial 15, the aerial circuit including a resistance 16 upon which is a movable tapping point 17 connected to a movable tapping point 18 upon the coil 14. In use the receiving amplifier is tuned as accurately as possible to the signals desired to be received, the switch contacts 3, if such contacts be provided, are then opened and the coupling of the coils 13 and 14 and, if necessary, the tapping points 17 and 18, moved until the signal is as nearly as possible balanced out.

The switch contacts 3, if provided, are now reclosed and the directional finding receiver operated in the usual way. When the switch contacts 3 are reclosed it will be found that the "zero definition" is greatly improved though it may be found necessary in some cases slightly to readjust the coupling between coils 13 and 14 to compensate for apparent aerial circuit imperfections, quadrature effect, and the like. If switch contacts 3 be not provided the desired adjustment may in practice be effected by manipulating the coupling between the coils 13 and 14.

It should be noted that by virtue of the relatively movable arrangement of the coils 13 and 14 adjustment both in amplitude and phase of the correcting signal component may be made.

The modification shown in Figure 2 of the drawings is in general principle very similar to that shown in Figure 1 thereof, like parts being indicated by like reference numerals. The principal difference between Figures 1 and 2 of the drawings is that in the latter figure a separate valve 19 is provided for amplifying the signals obtained from the "sense finding" aerial 15. The two-position switch SW is provided for taking "sense" readings. The coils K couple the output circuit of valve 19 to the input circuit 1, 2, of the valve 4.

With the switches 3 open and the switch SW in the position shown, the system may be balanced as described above in connection with Figure 1 by adjusting the coupling and sense of coupling between 13 and 14 until no signal is received. Now the effect of signal and stray energy on the receiver elements and circuits is compensated. The switches 3 are now closed and the correct line of direction of the signalling secure may be accurately taken. If switch SW is now thrown in the lower position, the vertical effect obtained in the linear conductor 15 and amplified in the tube 19 may be added to the directional effect obtained in the frame aerial 1 and the sense of direction of the signalling source may be determined.

The accompanying drawings show a further modification wherein the arrangement illustrated in Figure 2 of the drawings is adapted for use in connection with so-called Bellini-Tosi aerials of large dimensions. Where such aerials are employed the use of a separate open aerial is inconvenient and leads to undesired practical complications. It is therefore preferred to employ in manner well known per se the "vertical" effect of the loops of the Bellini-Tosi aerial system for giving sense readings and the accompanying figure shows an arrangement wherein this is accomplished and therein the said "vertical" effect is also utilized for providing the required balancing component.

Those parts in the accompanying drawings which correspond to the parts in Figures 1 and 2 of the drawings are indicated by like reference and as will be seen the principal differences between the arrangement shown in the accompanying drawings and that shown in Figure 2 of the drawings are (1) the utilization of the "vertical" effect of the loops of the Bellini-Tosi aerial system, this utilization being, of course, effected by virtue of the fact that the grid of the valve 19 is coupled as shown to the midpoint of the radiogoniometer, which is connected to ground by way of a variable resistance, as shown, (2) a separate source of grid bias for the valve 19 is dispensed with, the required control of the amplification of this valve being obtained by means of the potentiometer 20 associated with the anode feed therefor, and (3) the coil 1 of the arrangement shown in Figure 2 of the drawings is in effect constituted by the search coil 1a of the radiogoniometer, the field coils of which are at north, east, south and west, as indicated by the letters N S, E W.

It should be noted that in order to obtain the best results in carrying out the present invention it is necessary effectively and satisfactorily to screen the unit comprising the coils 13 and 14 and also to screen the connections to the coil 13.

Having thus described my invention and the operation thereof, what I claim is:

1. A directional receiving apparatus including an aerial system and a relay and means for balancing out energy directly absorbed by the relay comprising, a directional pick-up device, the directional characteristics of which may be orientated, a thermionic tube having its input electrodes coupled by way of a switch to said pick-up device, a vertical aerial, a variable coupler of the inductive type having one winding variably coupled to said vertical aerial, a connection between the other winding of said coupler and the anode of said tube, and a device for coupling the anode of said thermionic tube to a receiver.

2. A directional signalling system including an energy absorption system and a thermionic relay, and means for balancing out energy directly absorbed by the relay comprising, a directional pick-up device, the directional characteristic of which may be orientated, a thermionic tube having its input electrodes coupled by way of a switch to said pick-up device, a vertical aerial, a variable coupler of the auto-transformer type having one winding variably connected to said vertical aerial, a connection between the other winding of said coupler and the anode of said tube, and a thermionic device for coupling the anode of said thermionic tube to a receiver.

3. A directional signalling device including an antenna system and a relay connected thereto, and means for balancing out energy in the relay directly absorbed thereby and for determining the sense of direction of the signalling source comprising, a directional pick-up device, the directional characteristic of which may be orientated, a thermionic tube having its input electrodes connected by way of a switch to said pickup device, a vertical aerial, a variable coupler of the auto-transformer type having one winding variably coupled by way of a second thermionic tube to said vertical aerial, a connection between the other winding of said coupler and the anode of said first named tube, and a third thermionic device for coupling the anode of said first named thermionic tube to a receiver.

4. A directional receiver comprising, a rotatable frame aerial, a vertical aerial, a thermionic tube having its input electrodes connected by way of a switch to said frame aerial, a coupler comprising a fixed winding and a rotatable winding in series, means for coupling one of said windings to the anode of said tube, adjustable means for coupling the other of said windings to said vertical aerial, and a second thermionic tube having its input electrodes coupled to the output circuit of said first named tube.

5. A directional receiver comprising, a rotatable tuned frame aerial, a vertical aerial, a thermionic tube having its input electrodes connected by way of a switch to said frame aerial, a coupler comprising a fixed winding and a rotatable winding in series, a circuit connecting one of said windings to the anode of said tube, adjustable means for connecting the other of said windings to said vertical aerial, and a thermionic tube having its input electrodes coupled to the output circuit of said first named tube.

FRED WOODS.

CERTIFICATE OF CORRECTION.

Patent No. 1,955,267. April 17, 1934.

FRED WOODS.

It is hereby certified that error appears in the printed specification of the above numbered patent requiring correction as follows: Page 2, first column, line 23, for the word "secure" read source; and that the said Letters Patent should be read with this correction therein that the same may conform to the record of the case in the Patent Office.

Signed and sealed this 5th day of January, A. D. 1937.

Henry Van Arsdale (Seal) Acting Commissioner of Patents.